(12) United States Patent
Bevilaqua

(10) Patent No.: US 6,729,575 B2
(45) Date of Patent: May 4, 2004

(54) PROPULSION SYSTEM FOR A VERTICAL AND SHORT TAKEOFF AND LANDING AIRCRAFT

(75) Inventor: Paul Bevilaqua, Newhall, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/112,145

(22) Filed: Apr. 1, 2002

(65) Prior Publication Data
US 2003/0183723 A1 Oct. 2, 2003

(51) Int. Cl.$^7$ ............................................. B64D 27/02
(52) U.S. Cl. ....................... 244/12.3; 244/53 R; 244/55; 244/23 D
(58) Field of Search .......................... 244/12.3, 12.4, 244/12.5, 23 B, 23 D, 52, 53 R, 55; 60/230, 226.1, 226.2, 225, 228, 204

(56) References Cited

U.S. PATENT DOCUMENTS

| 4,080,785 A | * | 3/1978 | Koff et al. ................. 60/226.1 |
| 4,222,233 A | * | 9/1980 | Johnson et al. ............... 60/225 |
| 4,474,345 A |   | 10/1984 | Musgrave |
| 4,791,783 A |   | 12/1988 | Neitzel |
| 4,979,363 A | * | 12/1990 | Hitchcock et al. ......... 60/226.3 |
| 5,209,428 A | * | 5/1993 | Bevilaqua et al. ......... 244/12.3 |
| 5,809,772 A | * | 9/1998 | Giffin, III et al. ......... 60/226.1 |
| 6,260,800 B1 | * | 7/2001 | Snell ........................ 244/53 R |

* cited by examiner

Primary Examiner—Galen L. Barefoot

(57) ABSTRACT

The invention is a propulsion system for a V/STOL aircraft. In detail, the invention includes a turbo-fan engine having a fan section with a variable pitch fan, a compressor section, a combustion section, a turbine section, said turbine section having a low-pressure turbine portion coupled to and driving the fan section and a high-pressure turbine portion coupled to and driving the compressor section. The engine further having a selectable operating point wherein a portion of the power generatable by the low-pressure turbine at a selected operating power setting is extracted to drive the fan section. A turbine outlet duct is included for directing the turbine section exhaust gases. A first angular shaped nozzle section is co-incident with the turbine outlet duct for directing exhaust from the fan section. A second nozzle section mounted to the first angular shaped nozzle section between the fan section and the compressor section. A system is included to shift said selectable operating point of said engine to a second operating point at the selected power setting increasing the power extracted by the low-pressure turbine portion of the turbine section; such that power extracted by the low-pressure turbine portion and applied to the fan section can be increased without changing the selected power setting and the pitch of the blades of the variable pitch fan section can be increased to absorb the increased power.

15 Claims, 8 Drawing Sheets

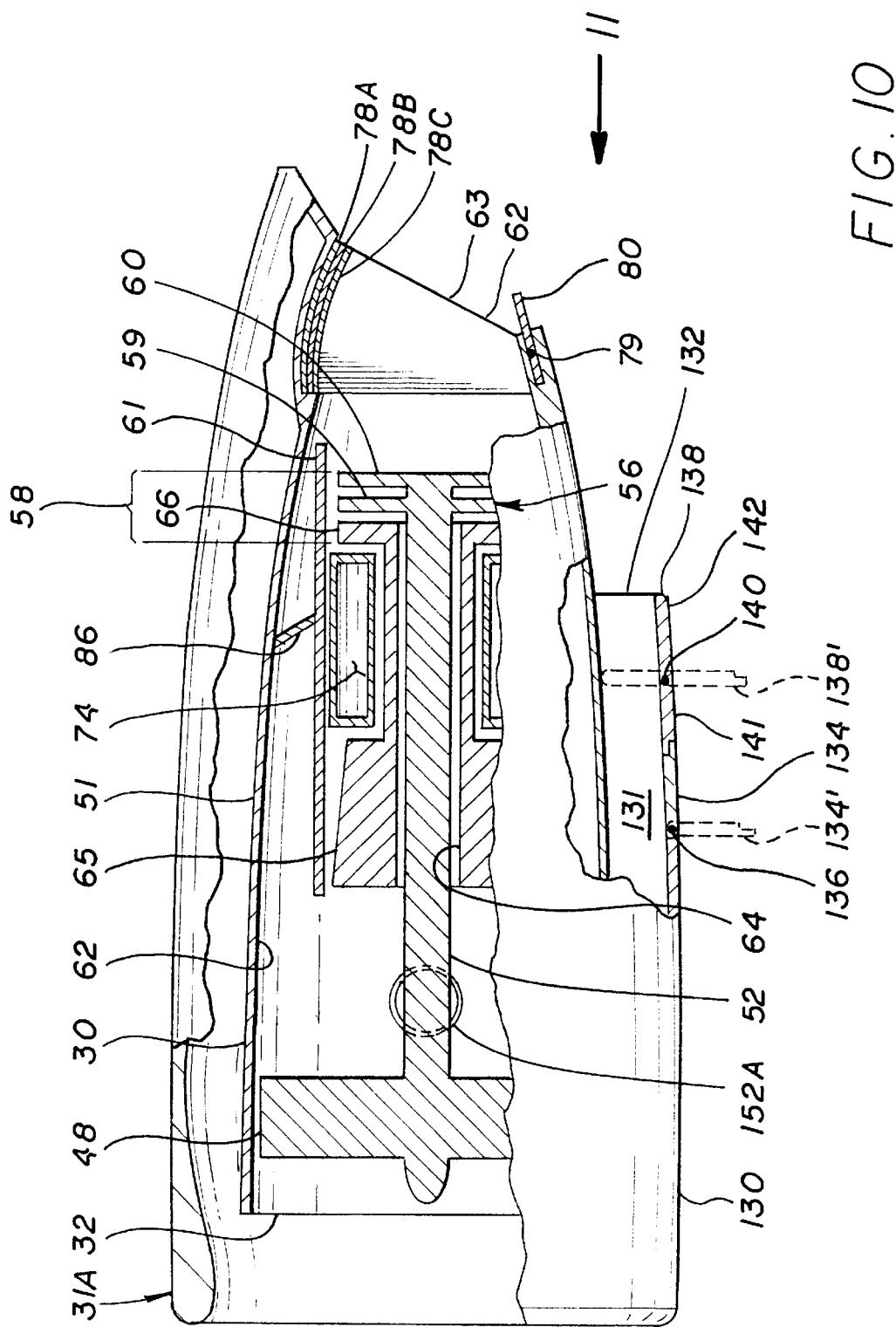

PROPULSION SYSTEM FOR A VERTICAL AND SHORT TAKEOFF AND LANDING AIRCRAFT

BACKGROUND OF THE INVENTION

1. Field of the Invention

The invention relates to the field of propulsion systems and, in particular, to a propulsion system for vertical and short takeoff and landing (V/STOL) aircraft.

2. Description of Related Art

The efficiency of a propulsion system for an aircraft increases as the exhaust velocity is reduced. Thus, during takeoff, landing and hovering, it is obvious that a helicopter, which provides a small incremental velocity to a large mass of air, is more efficient than a jet aircraft, which provides a large incremental velocity to a small mass of air. However, a helicopter, because of its very large diameter rotor, has a limited forward velocity, certainly not much over two hundred miles per hour. Thus, most V/STOL aircraft are compromises. For example, the AV-8A Harrier V/STOL aircraft utilizes a turbofan engine for both hover and cruise propulsion. As with a helicopter, the large fan provides significant thrust for vertical lift in hover, but its correspondingly large frontal area increases the drag of the aircraft and limits its maximum speed to subsonic speeds.

In U.S. Pat. No. 4,474,345 "Tandem Fan Series Flow VSTOL Propulsion System" by R. G. Musgrove, a jet engine with a small fan, which is capable of providing supersonic performance, is modified to provide vertical lift. The basic engine fan is split to provide fore and aft fans connected by means of a common drive shaft. The fans are centrally mounted in a duct located within the aircraft along its longitudinal axis. In normal wing borne flight (herein after referred to as normal flight), the fans operate in series with the fan exhaust mixing with the turbine exhaust and exiting through a nozzle located at the rear of the aircraft. In the vertical mode of operation, a diverter is positioned downstream of the forward fan and is movable to a position for diverting the exhaust from the forward fan downward relative to the longitudinal axis of the aircraft, while simultaneously opening an auxiliary inlet for permitting the introduction of air to the aft fan. An aft diverter is located in the nozzle which is also moveable to a position for diverting the exhaust from the aft fan and engine core downward. Thus, for vertical flight the diverters are actuated causing the exhaust from both fans and the core engine to be directed downward fore and aft of the center of gravity of the aircraft.

However, the tandem fan engine has less thrust in the vertical takeoff and landing mode of operation than it has in the normal flight mode of operation. The thrust is larger in cruise because airflow passes through both fans, and thus, the core is supplied with air that is raised to a higher-pressure level; whereas, in the vertical mode the core engine airflow passes through only the aft fan. Consequently, the tandem fan concept is not an efficient design for a V/STOL aircraft.

In U.S. Pat. No. 4,791,783 "Convertible Aircraft Engine" by R. E. Neitzel, a turbofan concept is disclosed for converting almost all the power used by the engine fan to shaft horsepower to drive a helicopter rotor. Guide vanes located on both sides of the outer portion of the engine fan can be actuated to block off airflow through the fan duct while still allowing airflow into the engine core. A gear mounted on the forward end of the fan shaft is coupled to a drive shaft, which in turn drives the rotor. Such a system provides maximum efficiency during takeoff and landing and also during normal flight. However, if high-speed flight is to be accomplished the rotor must be stopped (x-wing concept) or stopped and stored. The former concept severely limits the top speed of the aircraft, while the latter causes a severe weight penalty and requires a complex folding and storing system.

In U.S. Pat. No. 5,209,428 Propulsion System For A Vertical And short Takeoff And Landing Aircraft by P. M. Bevilaqua, et al. In detail, the invention comprises a turbofan engine mounted within the airframe having the fan face coupled to the inlet duct. The engine is a mixed flow type having fan, high-pressure compressor, combustion, turbine and exhaust nozzle sections. The turbine section includes a high-pressure turbine portion which drives the high-pressure compressor section and a low-pressure turbine portion which drives the fan section. The inner portion of the fan section is in front of the high-pressure compressor section and, thus, acts as a low-pressure compressor section. Since a first shaft to the low-pressure turbine portion connects the fan section and the high-pressure compressor is connected to the high-pressure turbine portion by a hollow shaft rotatably mounted about the first shaft, they are often referred to as spools. Thus, in the turbofan engine thus far described, it is referred to as a two-spool engine. Furthermore, the high-pressure compressor section, combustion section and high-pressure turbine portion are, collectively, referred to as the core or core engine.

In this type of engine, the turbine exhaust produces a significant portion of the total thrust thereof and, preferably, has a common fan and turbine exhaust nozzle section exiting (mixed flow) at the rear of the aircraft when operated in the normal flight mode. The exhaust nozzle section is designed to divert exhaust flow either horizontally for normal flight or vertically downward for takeoff and landing, and intermediate positions therebetween when transferring from vertical to horizontal flight and visa versa. A vertically mounted lift fan assembly, having a lift fan rotor, is positioned forward of the engine and connected by a drive shaft to the front of the engine fan. A clutch is mounted in the driveline between the lift fan assembly and engine for disconnecting the lift fan rotor from the engine. Power to drive the lift fan rotor is obtained by increasing the engine exhaust nozzle area (exhaust nozzle section exit cross-sectional area). This allows more power to be extracted from the turbine exhaust during V/STOL operation. The excess power is absorbed by the lift fan rotor, which is "clutched in" during takeoff and landing and the transition to and from normal flight. By doing so, the operating point of the engine is shifted so that more power is applied to the lift fan rotor, which is more efficient at these lower speeds. The lift fan exhaust duct assembly is equipped with a vectoring system to deflect the thrust from a vertical direction in vertical flight to an aft vectoring direction during transition to and from normal flight. After transitioning to horizontal flight, the operating point of the engine is returned to its normal cruise mode of operation, which is more efficient at higher speeds.

To control the power extracted from the low-pressure turbine section, a mechanism is provided for varying the exhaust nozzle exit cross-sectional area. Depending on the particular design of the turbofan, it may be desirable to add one or more additional turbines to the low-pressure turbine section in order to extract the additional power. It is important to note that only the low-pressure turbine section will sense the reduction in back pressure caused by an increase in nozzle exit cross-sectional area; thus, the high-pressure turbine portion driving the high-pressure compressor section will sense little or no decrease in back pressure.

If the engine is operated during normal flight as a mixed flow turbofan engine, it can also be operated as a separate flow engine in the vertical flight mode of operation. This accomplished by blocking off the fan duct with a plurality of doors, which divert the fan section exhaust to roll control nozzle assemblies. The roll control nozzle assemblies consist of a pair of ducts, which connect to the fan duct aft of the fan section and extend outward therefrom; terminating in downward directed variable cross-sectional area roll control nozzles. Valves located in the ducts, at the fan section duct wall, open to admit fan exhaust to the individual roll control nozzle assemblies, which are differentially controlled to develop roll control forces. Pitch axis control power for the aircraft in the vertical and transitional flight regimes is achieved by thrust modulation between the lift fan assembly and the engine core turbine exhaust. This is accomplished by variable inlet guide vanes located just upstream of the lift fan rotor and the variable cross-sectional area exhaust nozzle section. As the angle of the inlet guide vanes is varied, the power to drive the lift fan rotor is varied. Alternatively or concurrently, the lift fan assembly nozzle cross-sectional area may be varied to provide the same effect. Changing the thrust produced by the lift fan rotor requires that the power extracted by the low-pressure turbine portion to correspondingly change. This, of course, can be accomplished by changing the nozzle section exit cross-sectional area. While modulating the lift fan rotor and engine core exhaust thrust levels for pitch control, the sum of these thrusts remain essentially constant.

Thus, for takeoff the lift fan rotor is "clutched in" and the engine exhaust nozzle assembly is positioned to divert the exhaust downward. The nozzle section exit cross-sectional area is increased so that additional power is extracted from the turbine exhaust by the low-pressure turbine section and applied to the fan section and lift fan rotor. Therefore, the fan section to core airflow ratio (commonly called the engine bypass ratio) will have been increased significantly resulting in a higher thrust-to-horsepower specific ratio. After takeoff, the exhaust nozzle section is adjusted back to a position where the exhaust is directed along the longitudinal axis, which is accomplished slowly as the aircraft gains speed. The operating point of the engine is returned to its normal position, when the fan rotor is de-clutched, by decreasing the nozzle section cross-sectional area. The actual transition points, rates of nozzle cross-sectional area change and nozzle diversion angle change, etc. will vary with the design of the particular aircraft and engine used.

This propulsion system has been successfully flown in the single engine XF-35 Joint Strike Fighter aircraft and will be used in the production aircraft to be manufactured by the Lockheed Martin Corporation. However, the use of a lift fan limits its placement within the aircraft, primarily to the fuselage and is unsuitable for use in multi-engine aircraft with the propulsion systems mounted on wing mounted nacelles. In addition, in some applications the weight and/or "space" penalty associated with the use of a lift fan can not be tolerated in a single engine aircraft.

Thus, it is a primary object of the subject invention to provide a propulsion system for an aircraft, which allows for its placement in wing mounted engine nacelles of a V/STOL aircraft.

It is a still further object of the subject invention to provide a propulsion system for mounting in wing mounted nacelles of a V/STOL aircraft having improved efficiency in both the takeoff and landing flight modes.

An additional object of the subject invention is to provide a propulsion system for mounting in wing mounted nacelles of a V/STOL aircraft that is very efficient at high speeds and which has sufficient thrust during landing and takeoff.

SUMMARY OF THE INVENTION

The invention is a propulsion system for a V/STOL aircraft. In detail, the invention includes turbofan engine comprising: a fan section having a variable pitch fan; a compressor section; a combustion section, and a turbine section. The turbine section includes a low-pressure turbine portion coupled to and driving the fan section and a high-pressure turbine portion coupled to and driving the compressor section. Since a first shaft to the low-pressure turbine portion connects the fan section and the high-pressure compressor is connected to the high-pressure turbine portion by a hollow shaft rotatably mounted about the first shaft, they are often referred to as spools. Thus, in the turbofan engine thus far described, it is referred to as a two-spool engine. Furthermore, the high-pressure compressor section, combustion section and high-pressure turbine portion are, collectively, referred to as the core or core engine. In this type of engine, the turbine exhaust produces a significant portion of the total thrust thereof and, preferably, has a common fan and turbine exhaust nozzle section exiting (mixed flow) at the rear of the aircraft when operated in the normal flight mode.

The engine has a selectable operating point wherein a portion of the power generatable by the low-pressure turbine at a selected operating power setting is extracted to drive said fan section. A turbine exhaust duct directs the turbine section exhaust gases. A first angular shaped nozzle section coincident with the turbine exhaust duct directs exhaust from the fan section. The rear of the first nozzle section terminates in a rotatable nozzle and extends beyond the turbine exhaust duct and can be rotated from a horizontal position, wherein the rearward exhaust from the fan section as well as the first nozzle section is directed downward. A second exhaust nozzle section is mounted to the first angular shaped nozzle section between the fan section and compressor section. It is movable from a horizontal position directing a portion of the fan section exhaust rearward of the aircraft to a vertical position directing the fan section exhaust downward from the aircraft.

A roll control system is incorporated including first and second ducts having first ends coupled to the first nozzle section and second ends terminating in ports in the underside of the one of the wings of the aircraft. First control valves mounted in the first ends of the first and second ducts. Second control valves are mounted in the second ends of the first and second cuts. Thus when the first and second control valves are opened exhausts from the fan section can be diverted from the first annular shaped nozzle section and the second valves can be modulated providing role control.

Additionally, a mechanism is incorporated to shift the selectable operating point of the engine to a second operating point at the selected power setting increasing the power extracted by the low-pressure turbine portion of the turbine section. This mechanism is preferably a diverter valve assembly mounted in the first exhaust nozzle section aft of the first and second ducts of the roll control system. When actuated, this diverter valve assembly prevents fan section exhaust exiting the first nozzle section through the rotatable exhaust nozzle at the end thereof. This decreases pressure within the turbine exhaust duct. In addition, the rotatable exhaust nozzle of the first nozzle section can includes the capacity to increase its cross-sectional area, which also reduces pressure in the turbine exhaust duct. The engine may incorporate both mechanisms.

Both mechanisms will reduce the backpressure at the low-pressure turbine portion of the turbine section. Thus the power extracted by the low-pressure turbine portion and applied to the fan section can be increased without changing the selected power setting and the pitch of the blades of the variable pitch fan section can be increased to absorb the increased power.

In the V/STOL mode, pitch control can be accomplished by modulating the position of the diverter valves or the cross-sectional area of the rotatable exhaust nozzle of the first nozzle section with a simultaneous change in the pitch of the fan blades. That is for a pitch up, the backpressure on the low-pressure turbine section is reduced and the pitch of the fan blades is increased increasing the pressure so that more thrust to generated by the second nozzle section. For pitch down, the back-pressure in the low-pressure turbine section is increased, reducing the power transferred to the fan section with a simultaneous reduction in pitch of the fan blades. This causes more downward thrust from the rotatable exhaust nozzle of the first nozzle section and less thrust from the second nozzle section.

When the propulsion system is mounted within wing mounted nacelles on a multi-engine aircraft they function in a similar manner except for the roll control system. The roll control system in this application includes a first duct having a first end coupled to the first nozzle section of the right turbofan propulsion system and a second end terminating in a port in the underside of the left wing of the aircraft. The first duct includes first and second control valves mounted in the first and second ends, respectively. A second duct is included having a first end coupled to the first nozzle section of the left turbofan propulsion system and a second end terminating in a port in the underside of the right wing of the aircraft. The second duct includes third and fourth control valves mounted in the first and second ends, respectively. With this configuration, should one engine fail, horizontal attitude can still be maintained in the V/STOL condition.

For vertical takeoff, the engine is stared and the diverter valves are closed and roll control valves are opened and the second nozzle sections are rotated downward as well as the rotatable nozzles of the first nozzle section. The fan blade pitch is increased. This causes the engine core to transfer more power to the fan section. As the thrust is increased, the aircraft will take off vertically. After sufficient altitude is achieved, simultaneously, the second nozzle section is slowly rotated from the vertically downward position to the horizontal position; the end of the second nozzle section is rotated from the vertically downward position; the diverter valves are slowly opened; and the fan blade pitch is slowly decreased. This causes the engine operating point to shift and the aircraft transitions to horizontal flight. After sufficient horizontal speed is achieved, closing all the valves can deactivate the roll control system.

Transition back to the vertical flight mode is accomplished by essentially reversing the procedure. Simultaneously: the second nozzle section is slowly rotated from the horizontally downward position to the vertical position; the rotatable nozzle of the first nozzle section is rotated from the horizontal position to the vertically downward position; the diverter valves are slowly closed; the roll control valves are opened; and the fan pitch is increased. This causes the engine operating point to shift and the aircraft transitions to vertical flight. After horizontal speed is stopped, power can be reduced allowing the aircraft to descend and land.

The novel features which are believed to be characteristic of the invention, both as to its organization and method of operation, together with further objects and advantages thereof, will be better understood from the following description in connection with the accompanying drawings in which the presently preferred embodiments of the invention are illustrated by way of example. It is to be expressly understood, however, that the drawings are for purposes of illustration and description only and are not intended as a definition of the limits of the invention.

BRIEF DESCRIPTION OF THE DRAWINGS

Illustrated in FIG. 1 is a planform view of a V/STOL aircraft incorporating the subject propulsion system.

Illustrated in FIG. 2 is a cross-sectional view of the aircraft shown in FIG. 1 taken along the line 2—2, particularly illustrating the subject propulsion system.

Figure 2:
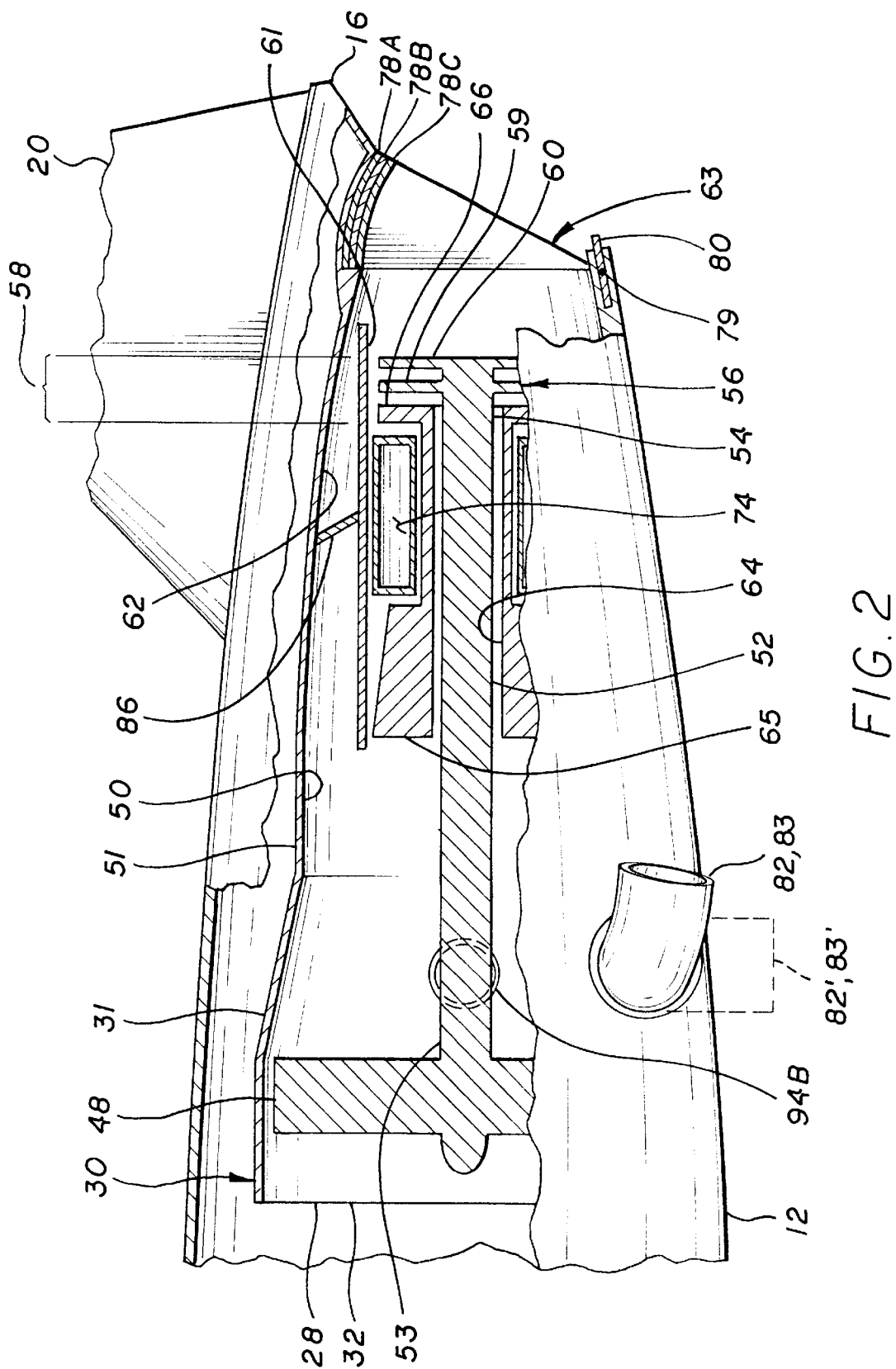
Figure 3:
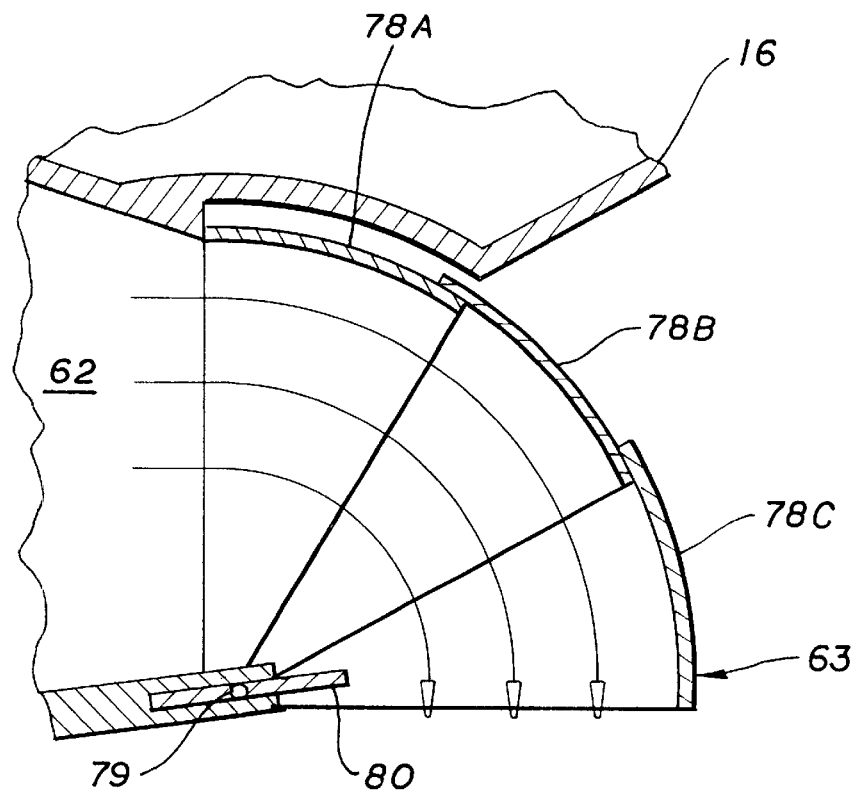

Illustrated in FIG. 3 is an enlarged view of the nozzle section of the propulsion system shown in FIG. 2.

Figure 1:
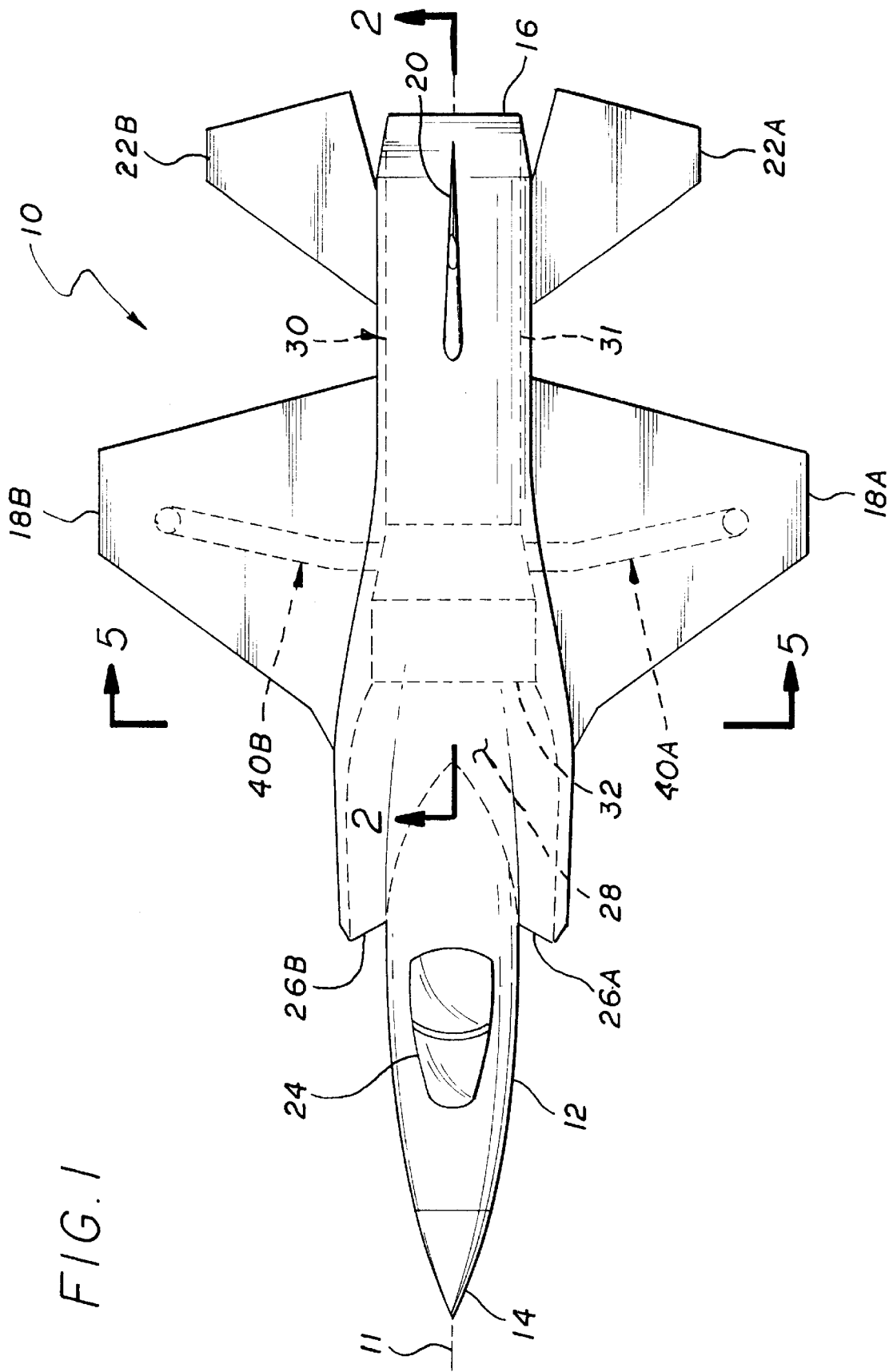
Figure 4:
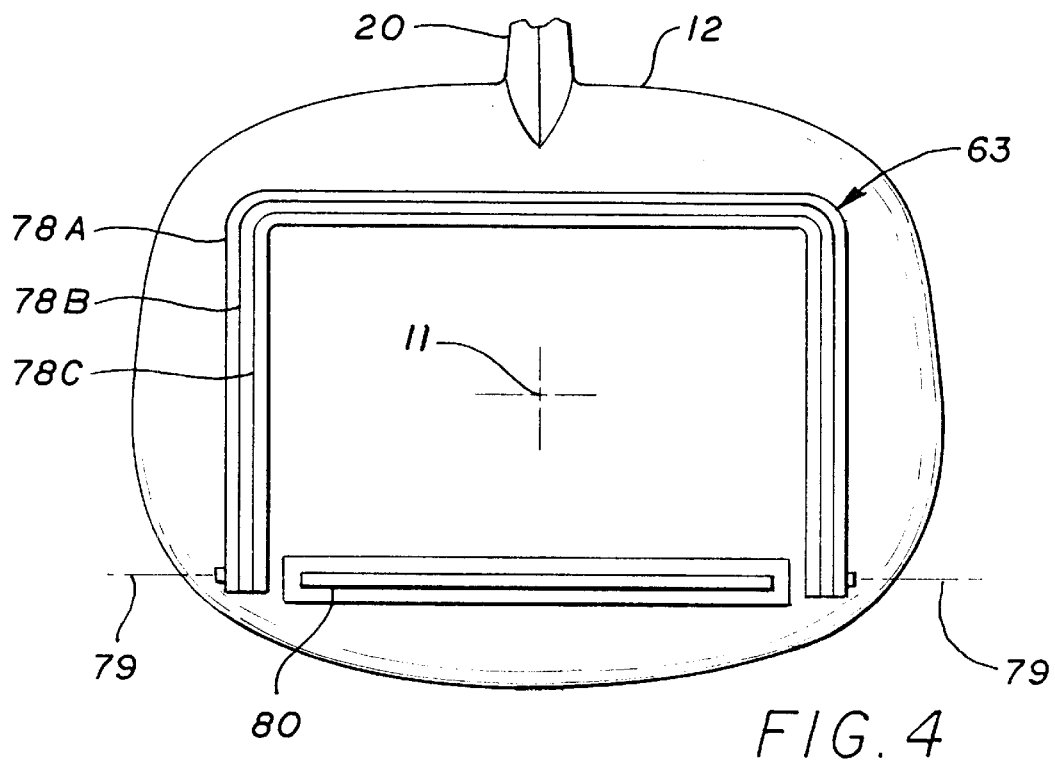

Illustrated in FIG. 4 is a view looking forward from the rear of the propulsion system shown in FIG. 1.

Figure 5:
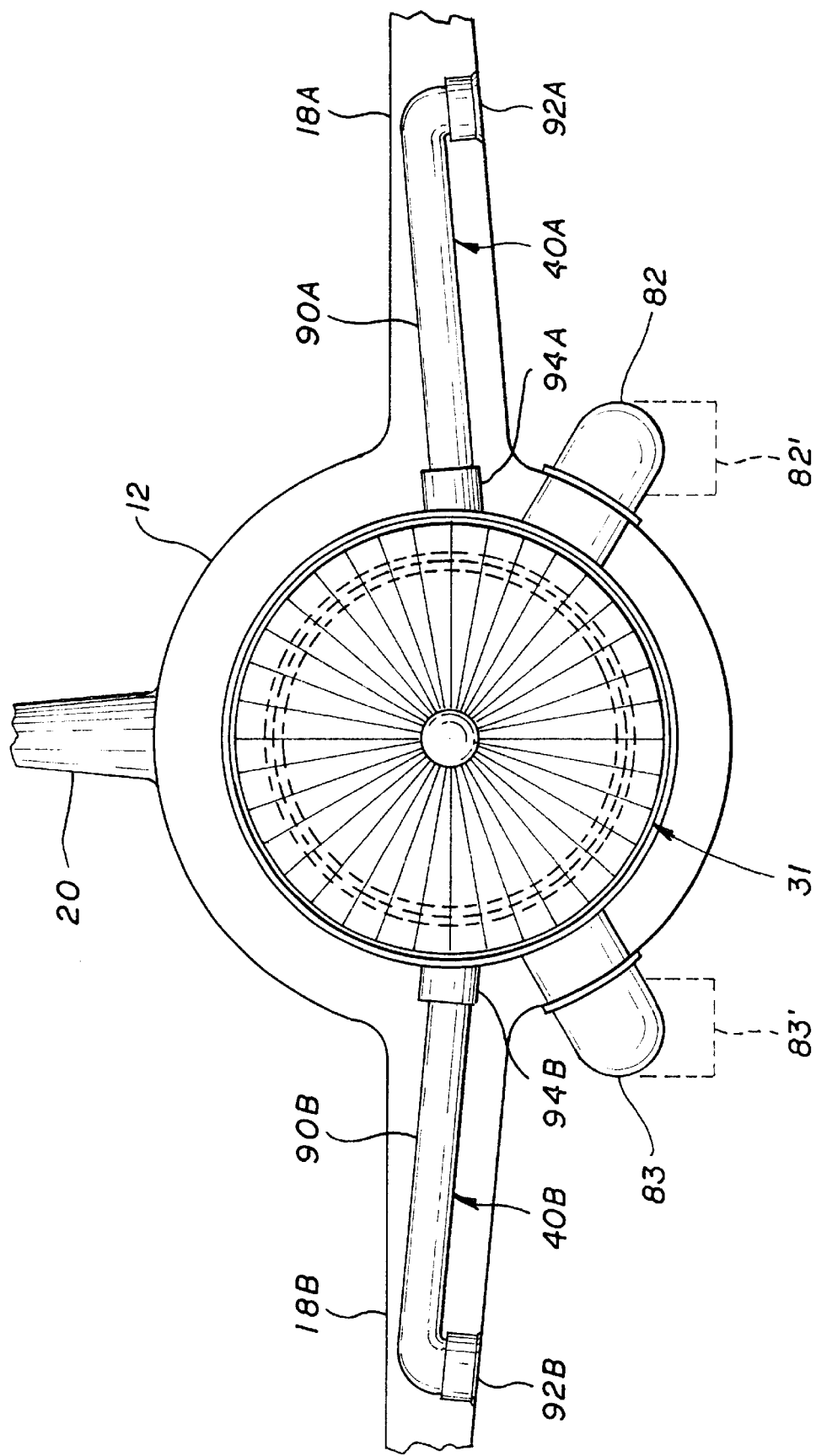

Illustrated in FIG. 5 is a cross-sectional view of the aircraft shown in FIG. 1 taken along the line 5—5.

Figure 6:
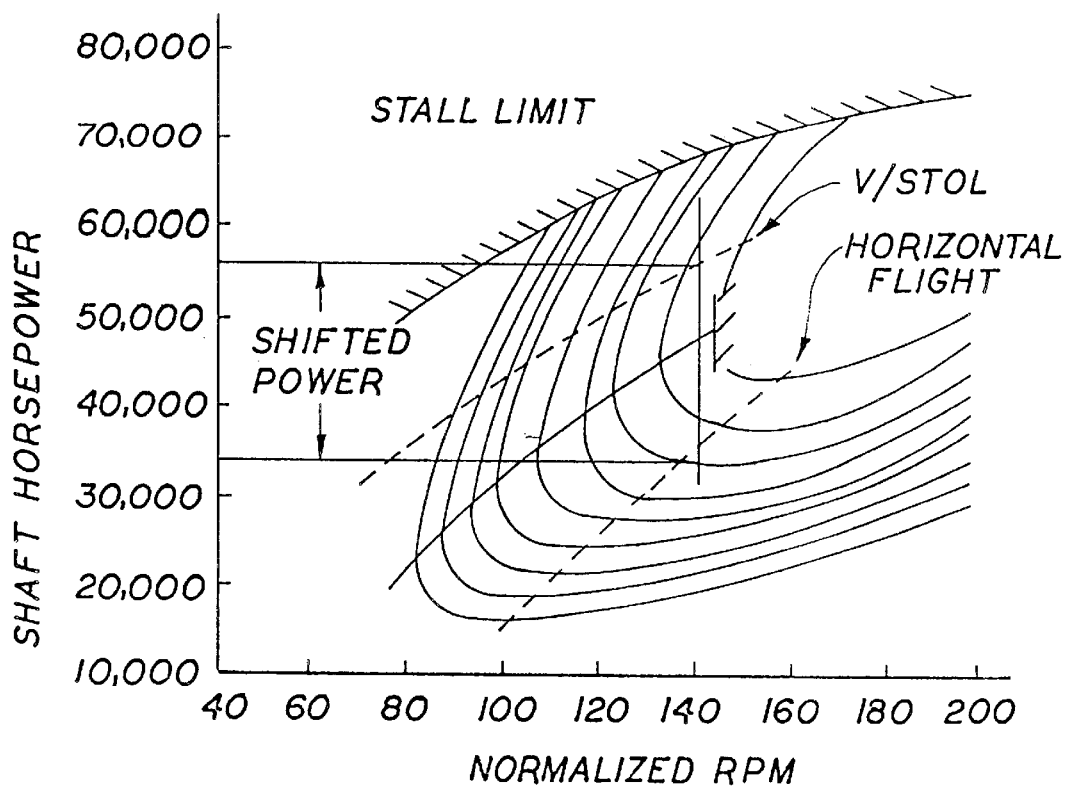

Illustrated in FIG. 6 is a graph of the low-pressure turbine performance map.

Figure 7:
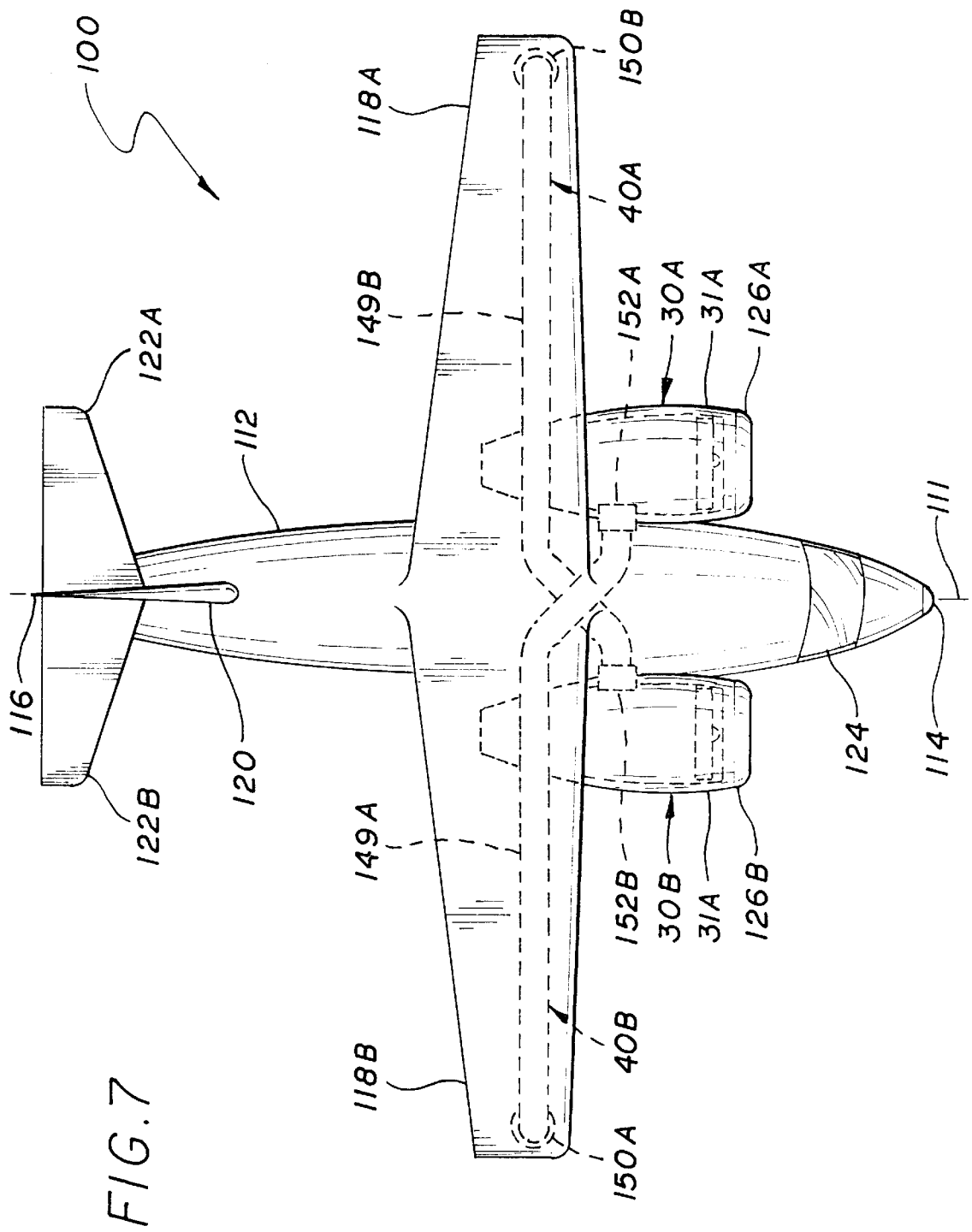

Illustrated in FIG. 7 is a planform view of twin engine aircraft incorporating the subject propulsion system.

Figure 8:
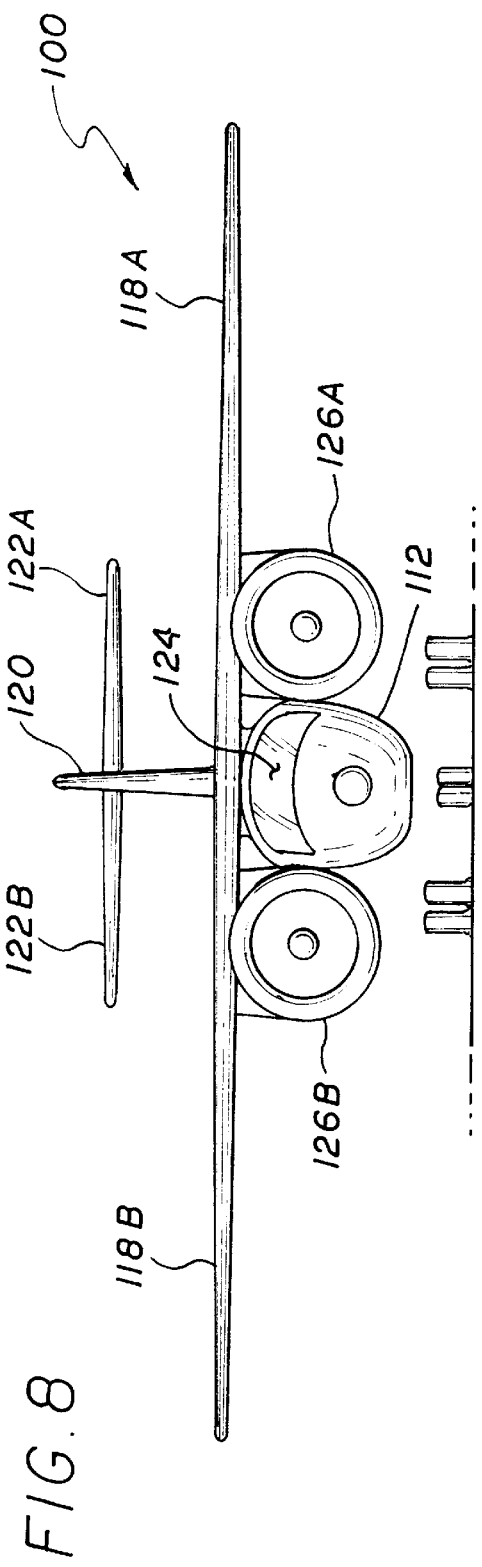

Illustrated in FIG. 8 is a front view of the twin engine aircraft shown in FIG. 7.

Figure 9:
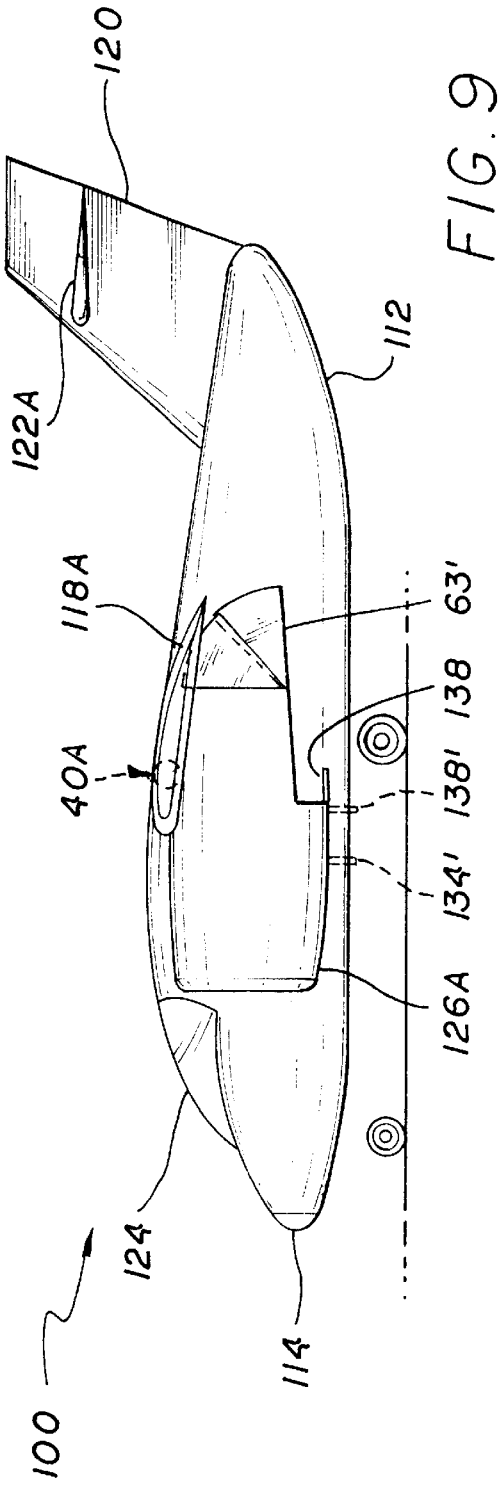

Illustrated in FIG. 9 is a side view of the aircraft shown in FIG. 7.

Illustrated in FIG. 10 is a partial cross-sectional view of the aircraft shown in FIG. 7, showing details of the propulsion system.

Figure 11:
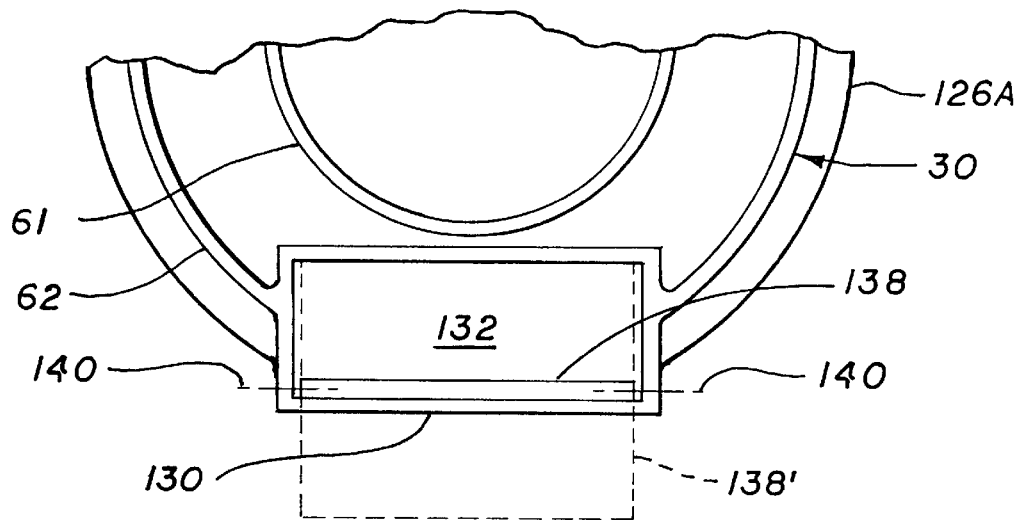

Illustrated in FIG. 11 is a partial view of the engine nacelle looking forward along the line 11.

DESCRIPTION OF PREFERRED EMBODIMENT

Illustrated in FIG. 1 is a single engine V/STOL type aircraft, generally indicated by numeral 10, having a longitudinal axis 11. The aircraft 10 includes a fuselage 12 with a nose 14, tail 16, wings 18A and 18B, vertical stabilizer 20, and horizontal stabilizers 22A and 22B. Other features include a cockpit 24, engine inlets 26A and 26B, which join to form an engine inlet duct 28. The subject propulsion system, generally indicated by numeral 30, includes a turbofan engine 31 having an inlet 32. Additionally illustrated are roll control assemblies, 40A and 40B, which are coupled to the engine 30 and exit to either side of fuselage 12 on the underside of the wings 18A and 18B, respectively. A further explanation of the function of the roll control nozzle assemblies 40A and 40B will be subsequently provided.

Illustrated in FIG. 2 is a partial cross-sectional view of the aircraft shown in FIG. 1 particularly illustrating the propulsion system 30. As previously stated, the propulsion system 30 includes the turbofan engine 31, and as depicted it is a two-spool mixed flow type wherein the fan and turbine exhausts are mixed together in a common duct and exit through a common nozzle. In further detail, the engine 31 includes a variable pitch fan 48 located within fan duct 50 defined by a cylindrical wall 51. The fan 48 is attached to a rotatably mounted drive shaft 52 at the shaft's end 53. The opposite end 54 of the drive shaft 52 is attached to a low-pressure turbine portion 56 of a turbine section 58. The low-pressure turbine portion 56, for purposes of illustration, incorporates two turbines 59 and 60. However, as will be subsequently discussed, in some instances only one or more than two may be necessary. A turbine section exhaust duct 61 extends aft of low-pressure turbine portion 56. A first exhaust nozzle section 62 extends from the rear of the fan duct 50 to the rear of the aircraft beyond the turbine exhaust nozzle section 61 and terminates in a rotatable nozzle 63, which will be subsequently discussed.

Rotatably mounted about the drive shaft 52 is a hollow drive shaft 64 attached at one end to a high-pressure compressor section 65 and at its opposite end to a high-pressure turbine portion of turbine section 58 and as illustrated comprising a single turbine 66. It should be noted that the high-temperature turbine section could include multiple turbines. A combustion section 74 is positioned between the high-pressure compressor 65 and high-pressure turbine 66. The high-pressure compressor section 65, combustion section 74 and turbine section 58 is typically called the core.

The rotatable nozzle section 63 is designed to divert the exhaust from a horizontal direction aligned with the longitudinal axis 11 (best seen in FIG. 1) for normal flight to a vertically downward direction (at least 90 degrees) for takeoff and landing. Still referring to FIG. 2 and additionally to FIG. 3, which is an aft view of the aircraft shown in FIG. 1, it can be seen that the rotatable nozzle 63 includes a plurality of rectangular telescoping sections 78A, 78B and 78C rotatably mounted at their ends about a pivot point 79. Thus, when the nozzle is retracted, it has a generally rectangular shaped cross-section and when extended, indicated by numeral 63', diverts the exhaust 90 degrees to a downward direction. Such rotatable nozzles are old in the art and thus, need not be discussed in further detail.

An extendable and retractable slidable plate 80 is located at the bottom of the rotatable nozzle 63. When the telescoping sections 78A-C are extended during takeoff and landing the exhaust nozzle 63 cross-sectional area can be varied by moving the plate 80 either inward or outward. In so doing the back-pressure within the turbine exhaust duct 61 is varied. Since the flow is subsonic within the exhaust nozzle section 61, the power extracted from the engine core exhaust by the low-pressure turbine portion 56 is a function of the pressure differential and the associated temperature change across the low-pressure turbine portion. Furthermore, the pressure and temperature of the combustion products leaving the combustion section 74 and passing through the high-pressure turbine 66 and entering the low-pressure turbine portion 56 is constant for a specific engine power setting; thus, power extraction increases as the pressure in the nozzle section 61 is reduced. The decrease in back pressure has little or no effect on the high-pressure turbine 66, thus, there is no effect on the compressor section 65. The additional power extracted from the turbine exhaust by the low-pressure turbine portion 56 is applied to the variable pitch fan 48.

Still referring to FIGS. 1–3, and additionally to FIG. 5, it can be seen tat the a pair of exhaust nozzles 82 and 83 in the shape of 90 degree elbows are coupled to the fan exhaust nozzle section 62, on either side of the longitudinal axis 11 (second exhaust nozzle section). The exhaust nozzles 82 and 83 are rotatable from a position aligned with the longitudinal axis 11 for horizontal flight to a vertical position for V/STOL operation indicated in dotted lines and numerals 82' and 83'.

The fan 48 exhaust can be blocked off by a plurality of doors 86, which are mounted on the wall 51 of first exhaust section 62. These doors 86 act as a diverter valve and are moveable inwardly so as to block off the fan 48 exhaust. Left and right roll control ducts 90A and 90B, respectively, are mounted in the exhaust nozzle section 62 downstream of the fan 48 and extend outward from the longitudinal axis 11 and terminate in left and right downward directed variable cross-sectional area roll control valves 92A and 92B, respectively. Control valves 94A and 94B control the flow into the ducts 90A and 90B, respectively, while valves 92A and 92B control the rate of flow for roll control.

Thus, the vertical or short takeoff procedure would begin with the starting of the engine 30. The rotatable nozzle 63 is adjusted such that the turbine exhaust is directed downward, the pitch of the fan 48 is increased. The nozzles 82 and 83 are rotated downward. The doors 86 are moved to a position wherein second nozzle section 62 is blocked off. The control valves 94A and 94B are opened. The slidable plate 80 is adjusted so that the engine operating point is shifted, such that more power is extracted by the turbine portion 56 (turbines 59 and 60) which is transferred to the fan 48. However, the additional power is only absorbed by the variable pitch fan 48 as the pitch increases. As engine power is increased, the aircraft will gain altitude on the thrust from the fan 48 via nozzles 82 and 83 and the exhaust nozzle 63. The valves 92A and 978 provide roll control and additional lift.

Referring to graph in FIG. 6, it can be seen that the engine has a selectable operating point wherein a portion of the power generatable by the low-pressure turbine, at a selected operating power setting, is extracted to drive the fan section. The difference between the upper line, V/STOL operation, and the lower line, horizontal flight, at a constant engine setting is the power shifted to the fan. Furthermore, the mechanism to shift this selectable operating point of the engine to a second operating point, at the selected power setting, changing the selected power setting, can comprise: a) a means to change the cross-sectional exit area of the nozzle section changing the back pressure aft of the turbine section; or b) means to divert the fan section exhaust from the nozzle section, which has the same effect; or c) a combination of both.

After sufficient altitude is reached, the telescoping sections 78A, 78B and 78C are slowly retracted allowing the turbine exhaust to move toward alignment with the longitudinal axis 11 of the aircraft producing a forward thrust. The exhaust nozzles 82 and 83 also are slowly rotated from a downward position aft. The doors 86 and telescoping sections 78A-C are modulated to control the resultant thrust at the desired angle as a function of aircraft forward speed during transition to normal flight. After sufficient aerodynamic lift is produced to maintain the altitude of the aircraft, the nozzles 82 and 83 are fully rotated to the horizontal position and the telescoping sections 78A-C are fully retracted and doors 86 are fully retracted and roll control valves 94A and 94B are closed. The slidable plate 80 is repositioned so that the engine operating point is returned to its cruise mode of operation and fan 48 pitch is reduced. For vertical or short landing the procedure is reversed.

While the propulsion system is usable in a single engine aircraft, it is primarily designed for use in a multi-engine aircraft. In particular, it is most applicable to an aircraft with pylon mounted engine nacelles on the wings. Here the propulsion system in U.S. Pat. No. 5,209,428 Propulsion System For A Vertical And short Takeoff And Landing Aircraft would be unsuitable because of the use of a shaft driven lift fan. However, the subject propulsion system, can be easily incorporated.

Referring to FIGS. 8–11, a twin engine aircraft is illustrated, generally indicated by numeral 100. The aircraft 100 has a longitudinal axis 111 and includes a fuselage 112 with a nose 114, tail 116, wings 118A and 118B, vertical stabilizer 120, and horizontal stabilizers 122A and 122B. Other features include a cockpit 124, engine nacelles 126A and 126B having inlet ducts 128A and 128B, respectively. The nacelles 126A and 126B are mounted under the wings 118A and 118B, respectively, and have propulsion systems 30A and 30B installed therein. They are generally similar to propulsion system 30. Each propulsion system includes turbofan engines 31A and 31B except different roll control assemblies and the exhaust nozzles 82 and 83 are replaced with a single nozzle. However, the use of rotatable nozzles is not precluded. Note that in the following discussion, all identical features with the turbofan engine 31 have identical numerical indicators.

The nacelle 126A includes an underside portion 130 that extends downward and is truncated at its aft end 132. The turbofan engines 31A includes an exhaust nozzle section 131 that extends from the exhaust nozzle 62 aft of the variable pitch fan 48 into the underside portion 130 of nacelle 126A and terminates at the aft end 132 thereof. A first door 134 is located in the bottom surface of the exhaust nozzle assembly 130 having a pivot axis indicated by numeral 136. It is movable to a downward position, indicated in dotted lines and by numeral 134'. A second door 138 having a pivot axis 140 includes a first section 141 that contacts door 134 and a second section 142 that extends aft of the its pivot axis 140. The second door 138 is rotatable such that the aft end 132 of the nozzle assembly 130 is blocked off (indicated in dotted lines and numeral 138'). Thus in horizontal flight, a portion of the fan 48 exhaust is directed into the exhaust nozzle section 62 and out the exhaust nozzle 63 thereof and also out the nozzle section 131. In the V/STOL flight mode, the first door 134 is rotated downward and the second door 138 is rotated about its pivot axis 140 such that the first section 141 is rotated upward blocking fan exhaust from moving aft and directs it downward. The propulsion system 30B in nacelle in nacelles 126B operates in an identical manner.

The roll control assembly 40A' includes a duct 149A that extends from the fan exhaust section 62 of the engine 30A through the fuselage 112 and onto the opposite wing 118B wherein it terminates in control valve 150A therein which directs the flow out of the bottom of the wing 118B. A second valve 152A is coupled between the engine 30A and duct controls flow into the duct 149A. The roll control assembly 40B' includes a duct 149B that extends from engine 30B trough the fuselage 112 and onto the opposite wing 118A wherein it terminates in control valve 150B therein which directs the flow out of the bottom of the wing 118A. A second valve 152B coupled between the engine JOB and controls flow into the duct 149B. By cross-coupling ends of the ducts into opposite wing, roll control is obtained with one engine out.

Thus, the vertical or short takeoff procedure would begin with the starting of the turbofan engine 31. The rotatable nozzle 63 is adjusted such that the turbine exhaust is directed downward, the pitch of the fan 48 is increased the doors 134 and 138 are also rotated downward. The doors 86 are moved to a position wherein the first nozzle section 62 is blocked off. The control valves 152A and 152B are opened. The slidable plate 80 is adjusted so that the engine operating point is shifted, such that more power is extracted by the turbine portion 56 (turbines 59 and 60) which is transferred to the variable pitch fan 48. However, the fan 48 absorbs the additional power. As engine power is increased, the aircraft will gain altitude on the thrust from the exhaust nozzle 63 and 131 with the valves 150A and 150B providing roll control and some additional thrust.

After sufficient altitude is reached, the telescoping sections 78A, 78B and 78C are slowly retracted allowing the turbine exhaust to move toward alignment with the longitudinal axis 11 of the aircraft producing a forward thrust. The doors 134 and 138 are slowly closed. The doors 86 and telescoping sections 78A-C are modulated to control the resultant thrust at the desired angle as a function of aircraft forward speed during transition to normal flight. After sufficient aerodynamic lift is produced to maintain the altitude of the aircraft, the doors 134 and 138 are completely closed. The nozzle 63 is fully rotated to the horizontal position and the telescoping sections 78A-C are fully retracted and doors 86 are fully retracted and roll control valves 152A and 152B are closed. The slidable plate 80 is repositioned so that the engine operating point is returned to its cruise mode of operation and fan 48 pitch is reduced. For vertical or short landing the procedure is reversed.

While the invention has been described with reference to particular embodiments, it should be understood that the embodiments are merely illustrative, as there are numerous variations and modifications, which may be made by those skilled in the art. Thus, the invention is to be construed as being limited only by the spirit and scope of the appended claims.

INDUSTRIAL APPLICATION

The invention has application in the aircraft industry and, in particular, too industries making propulsion systems for aircraft.

I claim:

1. A propulsion system for a V/STOL aircraft comprising:
    a turbofan engine comprising:
        a fan section having a variable pitch fan,
        a compressor section,
        a combustion section,
        a turbine section, said turbine section having a low-pressure turbine portion coupled to and driving said fan section and a high-pressure turbine portion coupled to and driving said compressor section, said engine having a selectable operating point wherein a portion of the power generatable by said low-pressure turbine at a selected operating power setting is extracted to drive said fan section;
        a turbine outlet duct for directing said turbine section exhaust gases; and
    a first angular shaped nozzle section co-incident with said turbine outlet duct for directing exhaust from said fan section;
    a second nozzle section mounted to said first angular shaped nozzle section between said fan section and said compressor section;
    means to shift said selectable operating point of said engine to a second operating point at the selected power setting increasing the power extracted by said low-pressure turbine portion of said turbine section;
    such that power extracted by said low-pressure turbine portion and applied to said fan section can be increased without changing the selected power setting, and the pitch of the blades of said variable pitch fan section can be increased to absorb said increased power.

2. The system as set forth in claim 1 wherein said means includes a diverter valve assembly mounted in said first exhaust nozzle aft of first and second ducts for preventing fan section exhaust to said roll control system and said third exhaust section.

3. The system as set forth in claim 2 further including a roll control system including:
   first and second ducts having first ends coupled to said second nozzle and second ends terminating in ports in the underside of the one of the wings of the aircraft;
   first control valves mounted in said first ends of said first and second ducts; second control valves mounted in said second ends of said first and second cuts; and
   such that when said first and second control valves are opened exhaust from said fan section is diverted torn said second annular shaped nozzle providing role control.

4. The system as set forth in claim 3 wherein said first nozzle section includes means to divert the exhaust from said turbine section from a direction generally aligned with the longitudinal axis to a generally vertically downward direction.

5. The system as set forth in claim 4 wherein said second nozzle section is movable from a horizontal position directing a portion of said fan section exhaust rearward of the aircraft to a vertical position direction said fan section exhaust downward from the aircraft.

6. The system as set forth in claim 5 wherein said means to shift said selectable operating point of said engine includes at least one of the group of: means to change the cross-sectional exit area of the nozzle section; and means to divert the fan section exhaust from the nuzzle section.

7. The system as set forth in claim 6 wherein said roll control system, when said first and second control valves are opened, extract more exhaust from said fan section that is produced by the increase in exhaust caused by the change in pitch of said variable pitch fan.

8. The system as set forth in claim 7 wherein said second nozzle section comprises a pair of rotatable ducts extending out of each side of said nozzle section of said turbo-fan engine.

9. A propulsion system for an aircraft having a fuselage and right and left wings with right and left engine nacelles mounted beneath each wing, respectively, the propulsion system comprising right and left turbo-fan engines comprising:
   a fan section having a variable pitch fan;
   a compressor section;
   a combustion section;
   a turbine section, said turbine section having a low-pressure turbine portion coupled to and driving said fan section and a high-pressure turbine portion coupled to and driving said compressor section, said engine having a selectable operating point wherein a portion of the power generatable by said low-pressure turbine at a selected operating power setting is extracted to drive said fan section;
   a turbine outlet duct for directing said turbine section exhaust gases; end
   a first angular shaped nozzle section co-incident with said turbine outlet duct for directing exhaust from said fan section;
   a second nozzle section mounted to said first angular shaped nozzle section between said fan section and said compressor section; and
   means to shift said selectable operating point of said engine to a second operating point at the selected power setting increasing the power extracted by said low-pressure turbine portion of said turbine section; such that power extracted by said low-pressure turbine portion and applied to said fan section can be increased without changing the selected power setting, and the pitch of the blades of said variable pitch fan section can be increased to absorb said increased power.

10. The system as set forth in claim 9 wherein said means comprises:
    a roll control system including:
       a first duct having a first end coupled to said second nozzle section of said right turbo-fan propulsion system and a second end terminating in a port in the underside of the left wing of the aircraft; said first duct having first and second control valves mounted in said first and second ends, respectively;
       a second duct having a first end coupled to said second nozzle section of said left turbo-fan propulsion system and a second end terminating in a port in the underside of the right wing of the aircraft; said second duct having third and fourth control valves mounted in said first and second ends, respectively;
       first and second diverter means mounted in said second exhaust nozzle sections of said first and second turbofans aft of the first and second ducts, respectively, for diverting exhaust fan section exhaust to said third nozzles and said roll control systems;
       such that when said first, second, third and forth control valves are opened exhaust from said fan section of the right and left turbo-fan engines diverted from said second annular shaped nozzles, thereof reducing the back pressure aft of said turbine section of said right and left turbo-fan engines.

11. The system as set forth in claim 9 wherein said first nozzle section of each turbo-fan engine includes means to divert the exhaust from said turbine section from a direction generally aligned with the longitudinal axis to a generally vertically downward direction.

12. The system as set forth in claim 10 wherein said second nozzle section of each turbo-fan engine is movable from a horizontal position directing a portion of said fan section exhaust rearward of the aircraft to a vertical position direction said fan section exhaust downward from the aircraft.

13. The system as set forth in claim 12 wherein said means to shift said selectable operating point of each said turbo-fan engines includes at least one of the group of: means to change the cross-sectional exit area of the nozzle section: and means to divert the fan section exhaust from the nozzle section.

14. The system as set forth in claim 13 wherein said roll control system said right and left turbo-fan engines, when said first, second, third and forth control valves are opened, extract more exhaust from said fan section of said right and left turbo-fan engines that is produced by the increase in fan exhaust caused by the change in pitch of said variable pitch fan.

15. The system as set forth in claim 14 wherein said third nozzle section comprises a pair of rotatable ducts extending out of each side of said second nozzle section of said right and left turbo-fan engine.

* * * * *